US00RE41604E

(19) United States
(12) Reissued Patent
Ashworth

(10) Patent Number: US RE41,604 E
(45) Date of Reissued Patent: Aug. 31, 2010

(54) HALFTONE PATTERNS

(75) Inventor: William Frederick Ashworth, Wellington (NZ)

(73) Assignee: Megadot Systems Limited, Wellington (NZ)

(21) Appl. No.: 12/557,313

(22) PCT Filed: Mar. 16, 2000

(86) PCT No.: PCT/NZ00/00029

§ 371 (c)(1),
(2), (4) Date: Nov. 26, 2001

(87) PCT Pub. No.: WO00/56062

PCT Pub. Date: Sep. 21, 2000

Related U.S. Patent Documents

Reissue of:
(64) Patent No.: 7,268,920
Issued: Sep. 11, 2007
Appl. No.: 09/936,530
Filed: Nov. 26, 2001

(30) Foreign Application Priority Data

Mar. 16, 1999 (NZ) ..... 334694
Mar. 16, 1999 (NZ) ..... 334695

(51) Int. Cl.
*H04N 1/405* (2006.01)

(52) U.S. Cl. ..... 358/3.2; 358/3.11
(58) Field of Classification Search ..... 358/1.9, 358/2.1, 3.06–3.12, 3.2; 382/237
See application file for complete search history.

(56) References Cited

U.S. PATENT DOCUMENTS

| | | | | |
|---|---|---|---|---|
| 3,725,574 | A | | 4/1973 | Gast |
| 4,084,183 | A | | 4/1978 | Keller et al. |
| 4,149,183 | A | | 4/1979 | Pellar et al. |
| 4,149,194 | A | * | 4/1979 | Holladay ..... 358/3.23 |

(Continued)

FOREIGN PATENT DOCUMENTS

| | | | | |
|---|---|---|---|---|
| DE | 2025609 | | | 12/1970 |
| DE | 2917242 | | | 11/1980 |
| DE | 2917242 | A | * | 11/1980 |
| DE | 2025609 | A | * | 12/1990 |
| EP | 370271 | | | 5/1990 |
| EP | 370271 | A2 | * | 5/1990 |
| EP | 418052 | A2 | * | 3/1991 |
| EP | 418052 | | | 3/1991 |
| EP | 748109 | A2 | * | 12/1996 |
| EP | 805586 | A2 | * | 11/1997 |
| GB | 1355540 | A | * | 6/1974 |
| WO | WO9006034 | A | * | 5/1990 |
| WO | 9006034 | | | 5/1990 |
| WO | 9010991 | | | 9/1990 |
| WO | WO9010991 | A | * | 9/1990 |

OTHER PUBLICATIONS

"Modern Illustration Processes", Charles W. Gamble, 1947, pp. 147–148.*

K. Haller, Fogra Research Report 6.029 (1982) (including excerpts translated into English of pp. 3, 9, 14, 18, 19, 20, 25, 26, and 27). Hell GmBH Dot Shapes, 6 pages (pre–1991).

C. Eliezer, "Color Screening: How to Judge the Results", *The Seybold Report on Publishing Systems,* vol. 21, No. 11, pp. 3–11 (Feb. 29, 1992).

(Continued)

*Primary Examiner*—Thomas D Lee
*Assistant Examiner*—Stephen M Brinich
(74) *Attorney, Agent, or Firm*—Young & Thompson

(57) ABSTRACT

The patterns can be used to reduce one or more undesirable effects such as moire or colour shift in coloured halftone images. Colour screens in the images are based on a combination of non-orthogonal mesh structures with parcels of printing dots which have common shape and size. Preferably the dots grow in mid tones by extending first towards their second, third or fourth nearest neighbours.

26 Claims, 14 Drawing Sheets

U.S. PATENT DOCUMENTS

| | | | | | |
|---|---|---|---|---|---|
| 4,185,304 | A | | 1/1980 | Holladay | |
| 4,196,451 | A | | 4/1980 | Pellar | |
| 4,680,645 | A | | 7/1987 | Dispoto et al. | |
| 4,894,726 | A | | 1/1990 | Steinhardt et al. | |
| 4,916,545 | A | | 4/1990 | Granger | |
| 4,918,622 | A | | 4/1990 | Granger et al. | |
| 5,233,441 | A | | 8/1993 | Hamilton | |
| 5,239,391 | A | | 8/1993 | Hamilton | |
| 5,253,084 | A | | 10/1993 | Rylander | |
| 5,381,247 | A | * | 1/1995 | Hains | 358/533 |
| 5,455,682 | A | * | 10/1995 | Ikuta | 358/3.16 |
| 5,680,222 | A | | 10/1997 | Ashworth | |
| 5,687,005 | A | * | 11/1997 | Fischer et al. | 358/3.09 |
| 6,072,592 | A | | 6/2000 | Ashworth | |

OTHER PUBLICATIONS

C. Eliezer, "Color Screening Technology: A Tutoorial on the Basic Issues", *The Seybold Report on Desktop Publishing,* vol. 6, No. 2, pp. 3–25 (Oct. 1991).

Desktop to Press, No. 9, 13 pages (Feb. 1992).

Gamble, C.W., "Modern Illuustration Processes", Sir Isaac Pitman & Sons, Ltd., London 1947, FIG. 26 at p. 148.

* cited by examiner

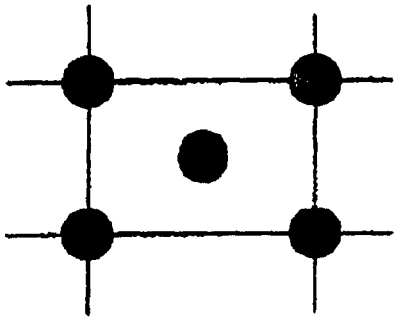
FIGURE 15
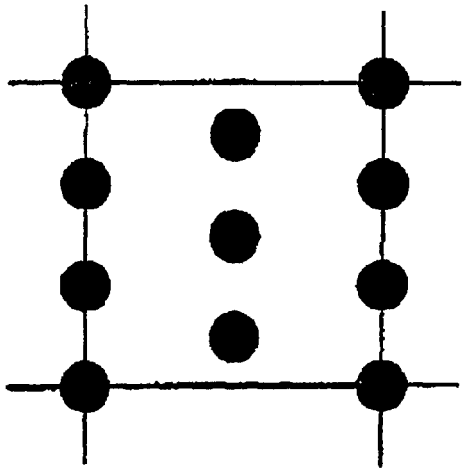
FIGURE 16
| | | | | | | |
|---|---|---|---|---|---|---|
| 4 | 16 | 28 | 33 | 26 | 11 | 3 |
| 12 | 24 | 20 | 7 | 19 | 23 | 15 |
| 31 | 35 | 8 | 1 | 6 | 34 | 30 |
| 17 | 25 | 21 | 9 | 18 | 22 | 10 |
| 5 | 13 | 27 | 32 | 29 | 14 | 2 |
FIGURE 17

HALFTONE PATTERNS

Matter enclosed in heavy brackets [ ] appears in the original patent but forms no part of this reissue specification; matter printed in italics indicates the additions made by reissue.

FIELD OF THE INVENTION

This invention relates to halftone printing processes and in particular to patterns of printing areas which may be used for preparing coloured images. These patterns include arrangements of the printing and non-printing areas which reduce the occurrence of moire and other effects in an image.

BACKGROUND OF THE INVENTION

Halftone processes suffer a number of problems including moire effects and colour shift. Production of images using these processes involves a compromise between the perceptible impact of different undesirable effects. Reference is made to U.S. Pat. No. 5,680,222 from the present inventor, and also to Colour Screening Technology: A Tutorial on the Basic Issues, The Seybold Report on Desktop Publishing, Vol 6, No.3, October 1991, for background information on these effects.

Moire includes both large and small scale effects due to periodic alignment of the halftone dots on a set of screens which are used to represent different colours and black. The colours are typically determined by the CMYK (cyan, magenta, yellow, black) system although various other separation systems are also used. Spurious moire patterns including lines and rosettes have frustrated printers for many years as indicated in the Seybold article mentioned above. Methods have been proposed to reduce these effects with varying degrees of success in varying circumstances.

Colour shift occurs when the dots of different colour separations or black overlap more or less than intended due to mis-registration of their respective patterns. For example, cyan and magenta inks are relatively intense in relation to yellow ink, and an increased overlap of the microscopic printing areas of one or other intense ink on yellow ink can reduce the intended visual impact of the yellow. A slight displacement of the halftone patterns, for example, or stretching of the medium on which the coloured image is eventually printed, can create an overlap and cause an inaccurate reproduction of the original colours.

Traditional halftone patterns or screens are generally Aorthogonal@ in that the printing areas arranged in lines on a square or rectangular mesh. The Aprinting areas@ are dots in light tones which link in various ways to become extended regions in darker tones. A Ascreen@ is formed for each of the respective colours or black in a selected colour system, and generally constitutes digital data for a computer-based process. Different screens may take a similar format but with different spacing between the lines of the mesh and a different angle of the lines from horizontal.

SUMMARY OF THE INVENTION

It is an object of the present invention to provide patterns which can be used to reduce one or more of the undesirable colour related effects in halftone images. Accordingly the invention may broadly be said to consist in a combination of non-orthogonal patterns with common parcels of printing areas amongst at least some of the patterns.

In one aspect the invention may be said to consist in a screen system for use in production of a coloured halftone image, wherein: a plurality of screens each represent different colours or black in the image, each screen has a pattern of printing areas which defines a minimum mesh, each pattern has a parcel of printing areas which repeats throughout the respective screen, and two or more of the screens have different non-orthogonal minimum meshes and have parcels which correspond in shape and size.

In another aspect the invention may be said to consist in a method of preparing halftone patterns for production of a coloured image, comprising: receiving information representing colour and tone variation in an image, creating a plurality of printing patterns which represent different colours or black in the image, forming each pattern from variable printing areas which define respective meshes and repeating parcels, at least two of the patterns having different non-orthogonal minimum meshes and corresponding parcels which are substantially similar in shape and size.

Preferably each minimum mesh is formed by two sets of parallel lines which lie along directions defined by equal shortest or shortest and next shortest distances between the printing areas.

BRIEF DESCRIPTION OF THE DRAWINGS

Preferred embodiments of the invention will be described with respect to the drawings, of which:

FIGS. 15 and 16 are halftone cells which might be used in creating non-orthogonal halftone patterns according to the invention, and FIG. 17 is a simplified threshold matrix for further explanation of the processes and cells of FIGS. 4 and 15.

DESCRIPTION OF THE PREFERRED EMBODIMENTS

Figure 1:
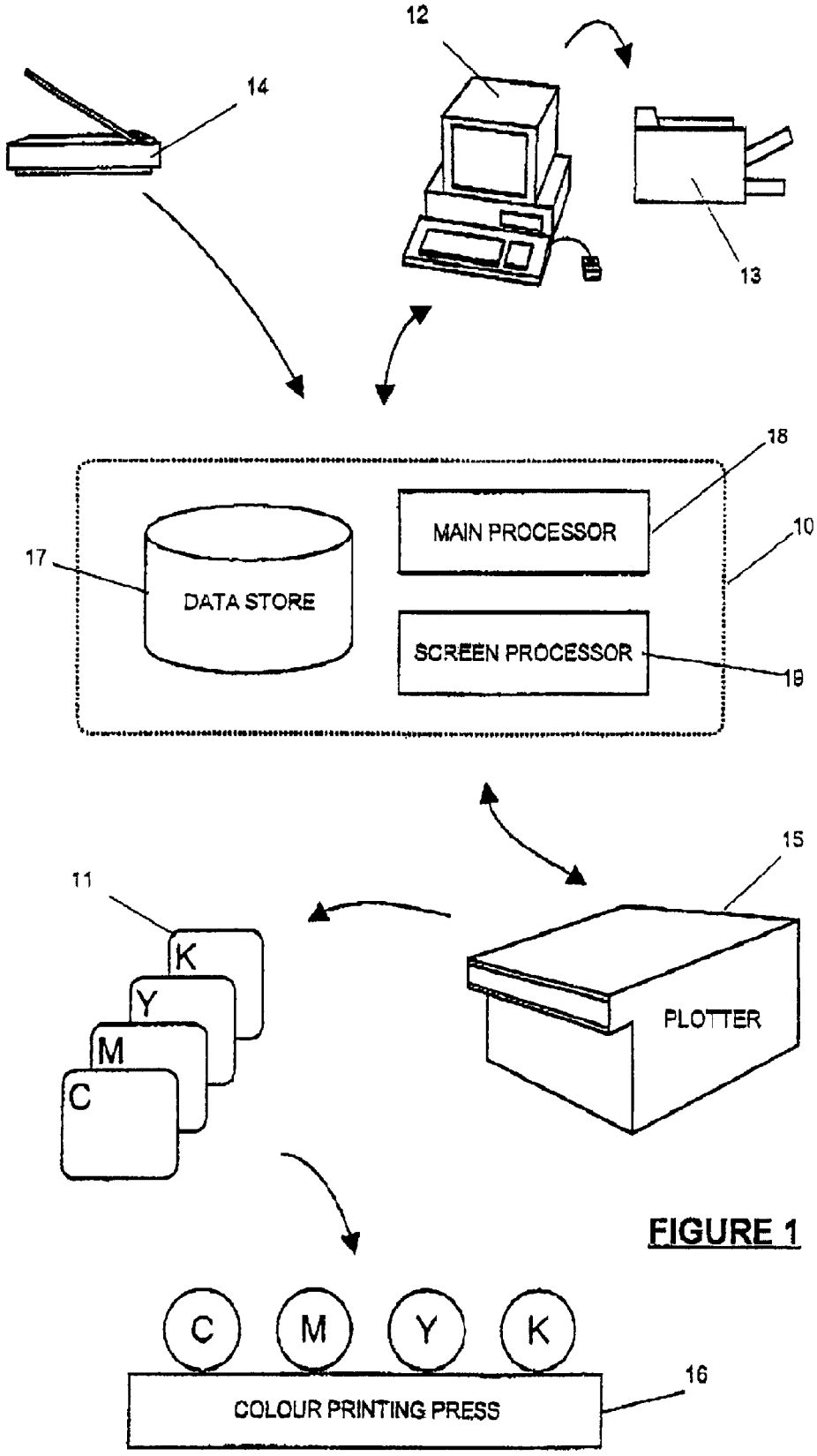
FIG. 1 is a schematic diagram indicating a combination of computer-based systems by which halftone processes may be implemented.

Referring to the drawings it will be appreciated that the various novel patterns must here be printed in black and white, and magnified by up to perhaps 1000 x for the purposes of a clear description. It is not possible to demonstrate their full advantage under these circumstances. Also that the patterns and various shapes of the printing and non-printing areas may be implemented by an appropriate mathematical construction of a spot function or a threshold matrix using a wide range of hardware and software which are already available, a schematic indication of hardware and software systems which are suitable for implementing the invention will be given, but details are left to the skilled reader, with direction to the references given above.

FIG. 1 indicates a highly schematic collection of computer-based or otherwise computer controlled equipment which might be used in production of halftone patterns and images, and in producing a result in printed form, a wide range of equipment and software is currently in use or under development and these times are shown by way of example only, for the purposes of explanation. That part of the processing which relates most closely to the invention usually takes place in a computer processor arrangement 10, which may be a separate item of equipment as indicated, or part of a more general item such as a desktop computer 12. This item generally has a main processor 18 and data storage capacity 17, and may also have a dedicated processor 19 for high speed processing of image data. Halftone patterns or screens 11 produced by the processor are indicated as physical forms 11 in the CMYK system, which might be film from an imagesetter or laser plotter 15 for example, or printing plates for a press 16. Alternatively the screens may be represented by computer data in a memory storage component such as a magnetic disk. An original image may be input to the equipment in various ways, such as from a photograph or other tangible artwork scanned by a digital scanner 14. Alternatively the original image may be created initially on a computer system such as a personal computer terminal 12, perhaps part of a desktop publishing system including a printer 13.

Figure 2:
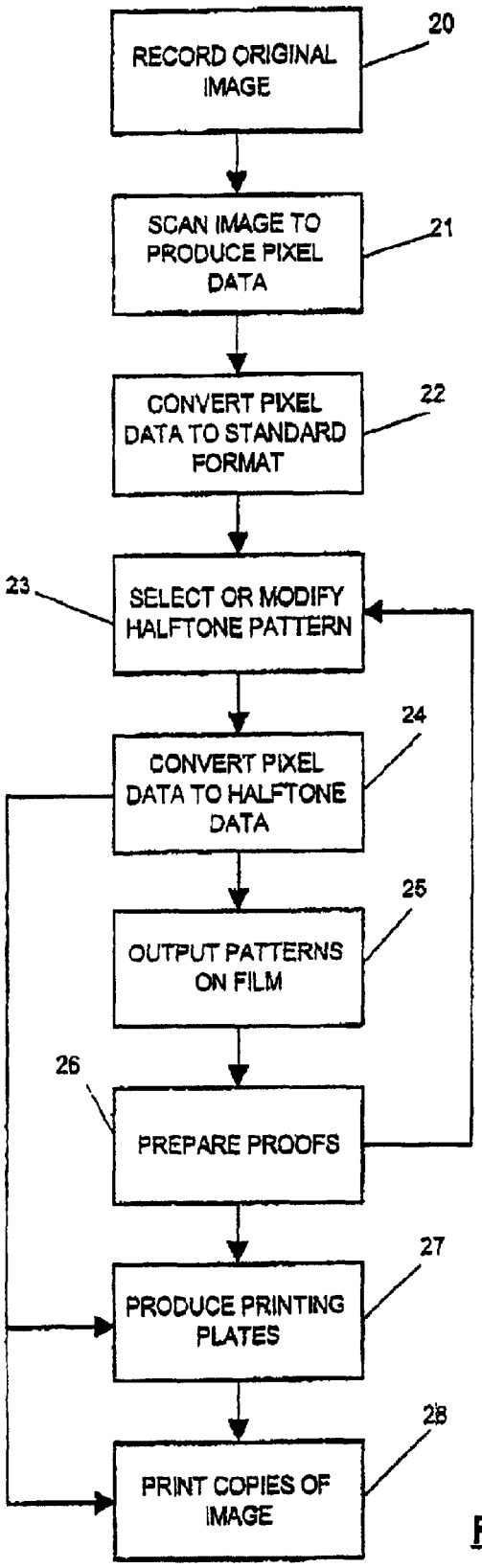
FIG. 2 is a flowchart indicating general processes in which a halftone image may be produce by scanning a recorded image.

One traditional process for preparing a halftone image is outlined in FIG. 2. An original image is recorded in step 20, as a photograph for example, and scanned in step 21. The resulting digital information is stored as pixel-based colour and intensity data. Pixels are square or rectangular elements generally aligned with vertical and horizontal directions of reference such as the directions of scanner movement. The pixel information is then processed into a standard format such as POSTSCRIPT in step 22, a wide variety of patterns and processes are then available for conversion of the pixel data to halftone screen data, and details appropriate to a particular image are selected by an operator in step 23. The conversion processes take place in step 24 by way of a computer system 10 such as that indicated in FIG. 1. The patterns are generally created from the pixel information by a raster image processing program or RIP, which calculates the locations, spacings and shapes of the halftone printing areas for each colour separation. An operator normally has a range of standard patterns installed on the equipment and may be able to develop variations of these patterns in some cases. Traditional calculations involve screen frequencies and angles although more sophisticated equipment enables patterns to be created without reference to these parameters. The operator is able to proof and modify the selection of patterns to minimise various effects such as moire, colour shift and tone jump according to the subsequent reproduction technique.

In FIG. 2, a coloured image based on the halftone data can be output in various ways, depending on the manner in which the image will be published and the equipment which is available. The patterns may be produced on film in step 25 and tested as proofs in step 26 which are inspected for defects such as moire. However, alternative halftone patterns and processes may be selected in step 23. If the proofs are acceptable, printing plates such as used in offset printing may be created in step 27 to enable a print run in step 28. Sometimes the plates are produced directly from the halftone data, as indicated. In other processes such as desktop publishing an image combining the patterns may be output directly without plates through a laser printer or other printing device, as also indicated. Details of each of the various items of equipment which might be used in these processes, such as those indicated in FIG. 1, are beyond the scope of this specification.

Figure 3:
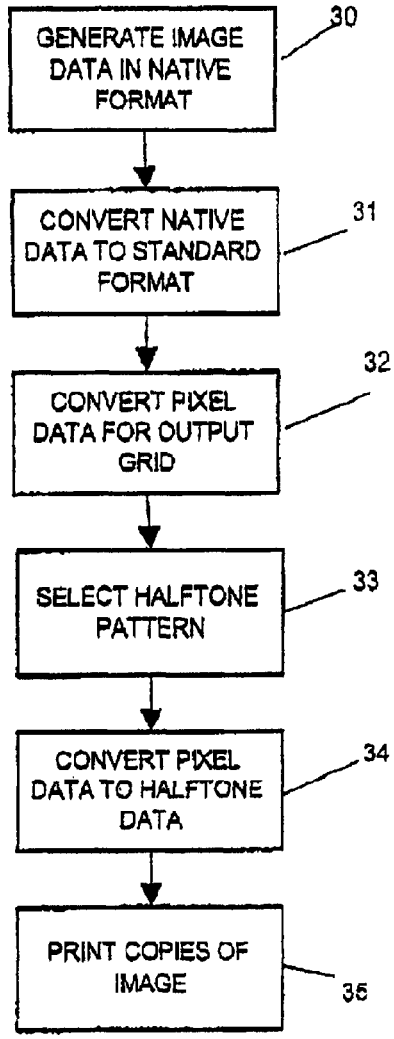
FIG. 3 is a flowchart indicating general processes by which a halftone image may be produced by generating an image initially on a desktop computer system.

FIG. 3 outlines an alternative and more direct process for generating and printing halftone images. An original digital image is created in step 30 on a computer device. The image data may be created using a graphics program and stored in a format which is native to the device, such as a particular vector or bitmap format for example. Parts of the image may also be imported from other sources such as clipart or scanned photographs, when composing a desktop publication for example. In step 31 the native data is converted into a standard format such as POSTSCRIPT which can be interpreted by an output device, such as local laser printer with the particular resolution. The pixel data must generally be converted in step 32 into a form which is appropriate for the particular printer, a device such as a laser printer uses a grid for placement of coloured ink spots and the pixel data is generally rastered to match this grid, a halftone pattern is selected either automatically or by an operator in step 33, a RIP or similar software then converts the pixel data into halftone data in step 34 which is sorted in computer memeoyur as part of the POSTSCRIPT information. Copies of the original image may then be printed in step 35 or transferred elsewhere from the stored data as required.

Figure 4:
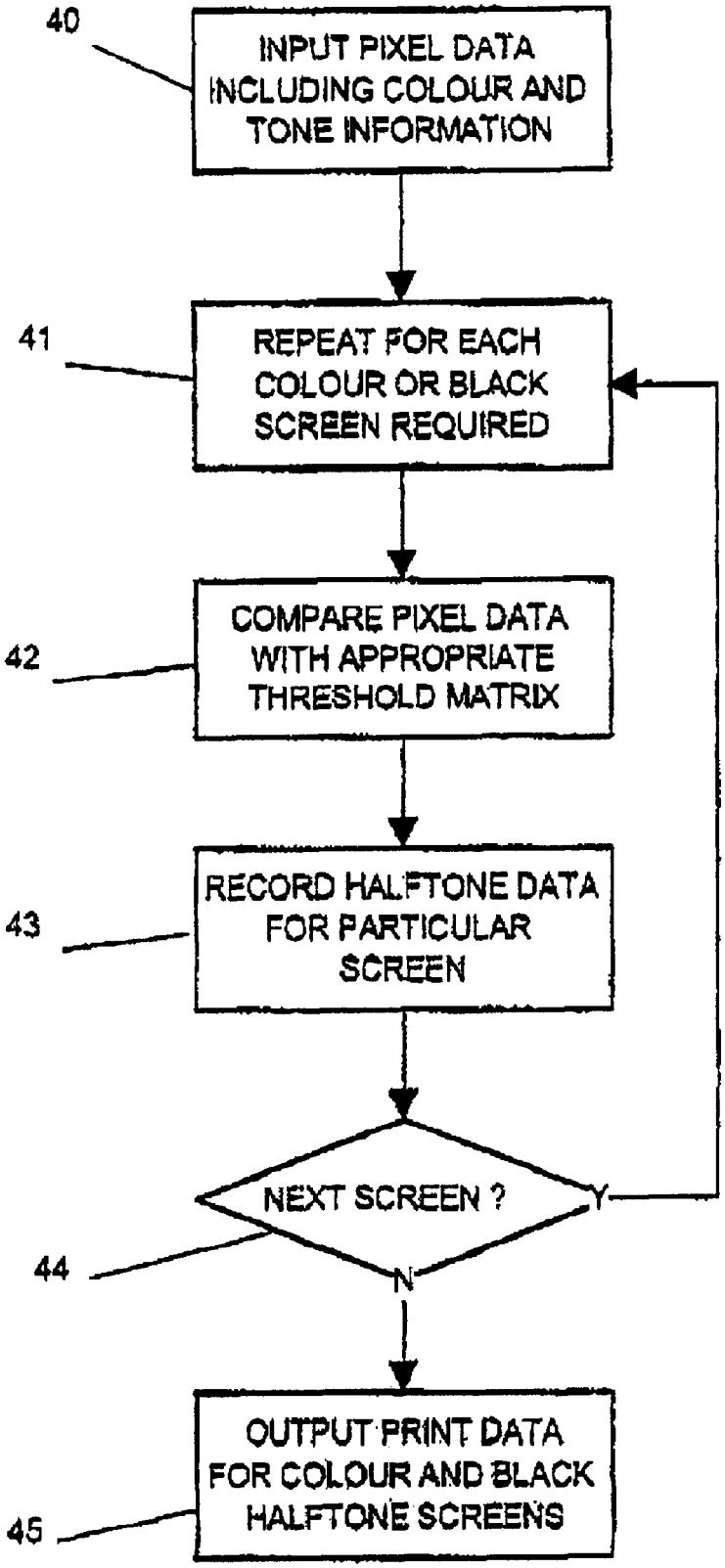
FIG. 4 is a flowchart indicating a general process for generating halftone screens from image data in FIG. 2 or 3, FIGS. 5a to 5d are four halftone patterns having a common tone density and different arrangements of printing areas.
Figure 5A:
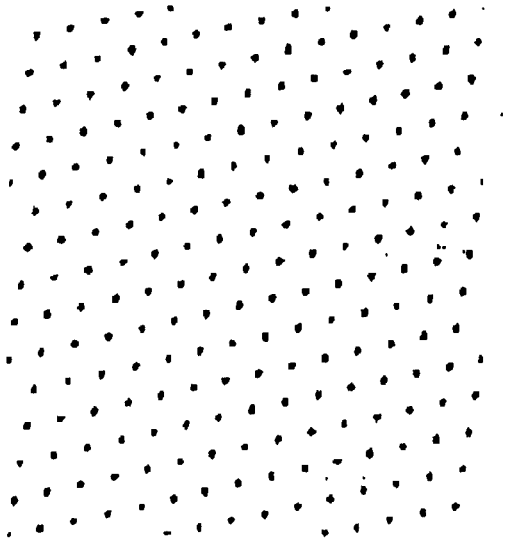
Figure 5B:
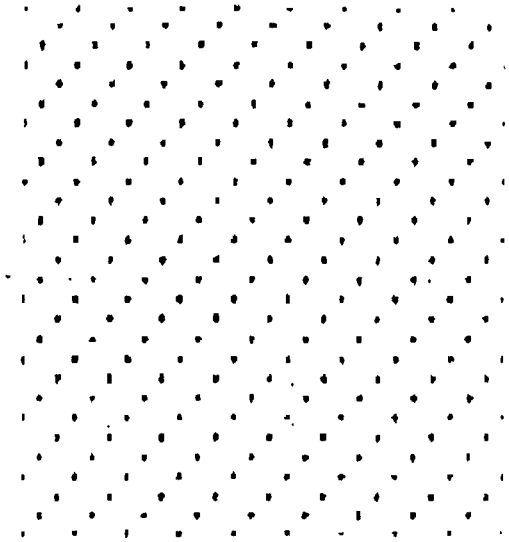
Figure 5C:
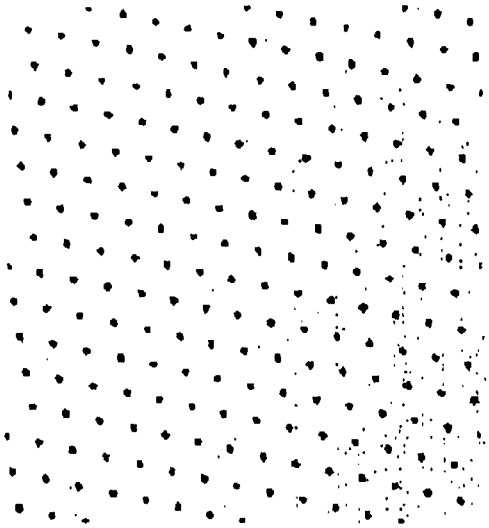
Figure 5D:
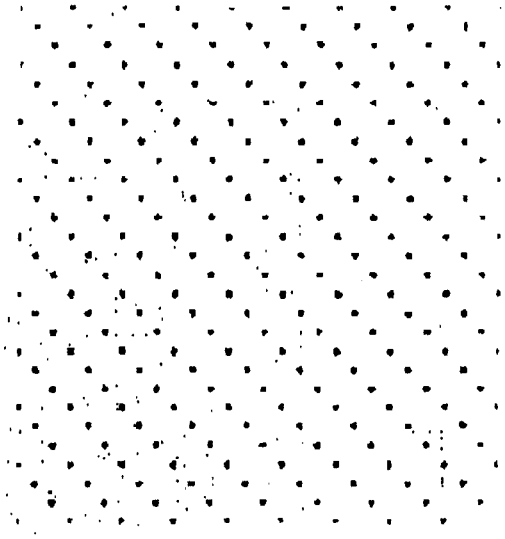
Figure 6A:
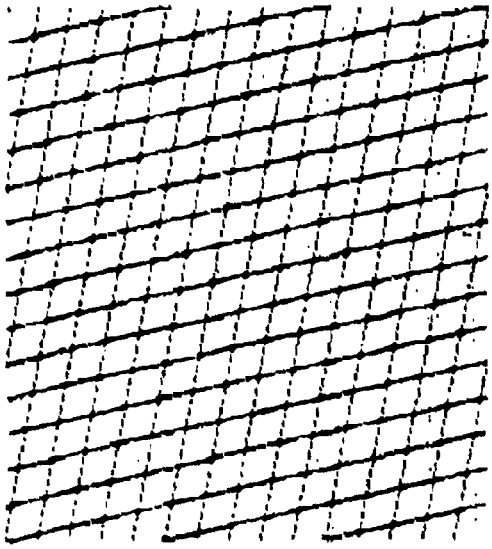
FIGS. 6a to 6d are the four halftone patterns with each defining a non-orthogonal mesh over the printing areas.
Figure 6B:
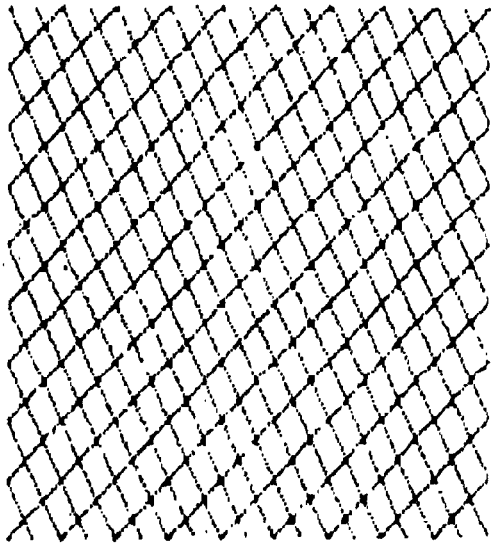
Figure 6C:
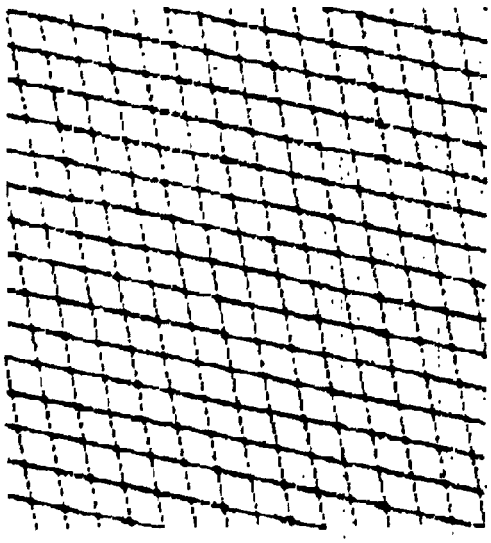
Figure 6D:
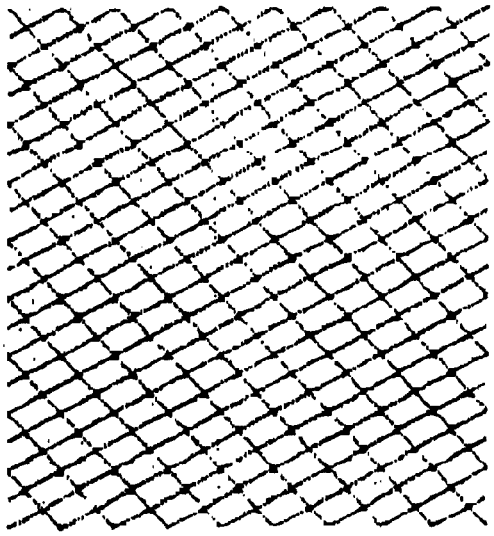
Figure 7A:
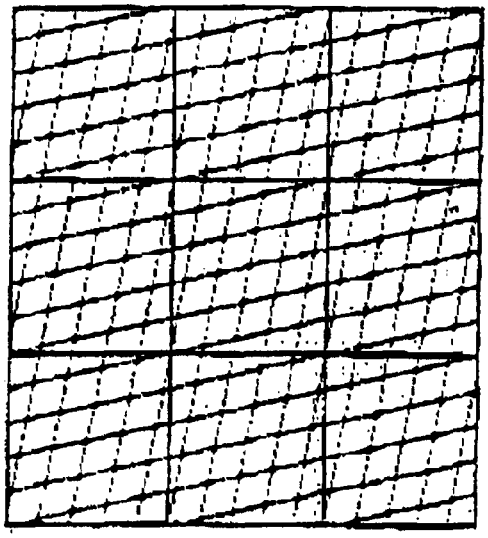
FIGS. 7a to 7d are the four patterns with each defining a non-orthogonal mesh and a repeating parcel of printing areas.
Figure 7B:
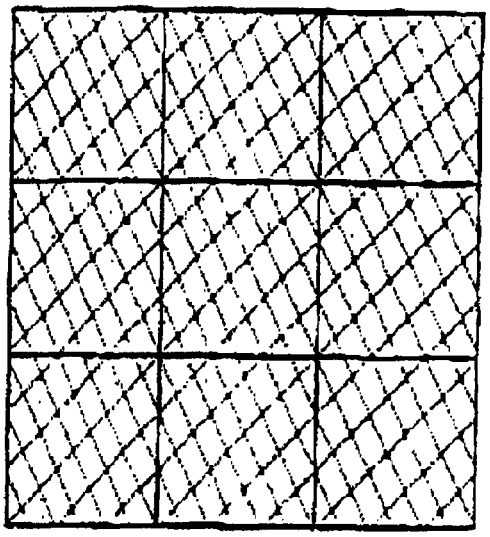
Figure 7C:
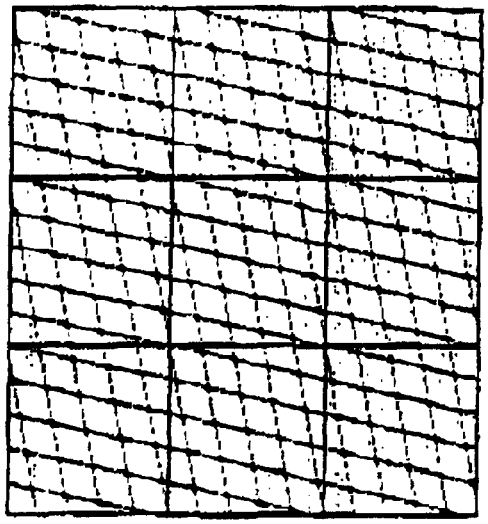
Figure 7D:
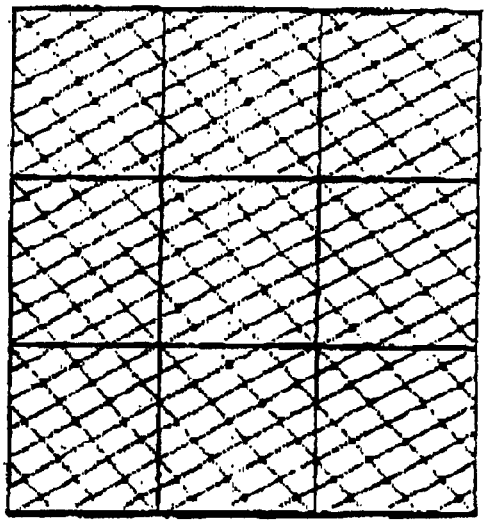
Figure 8A:
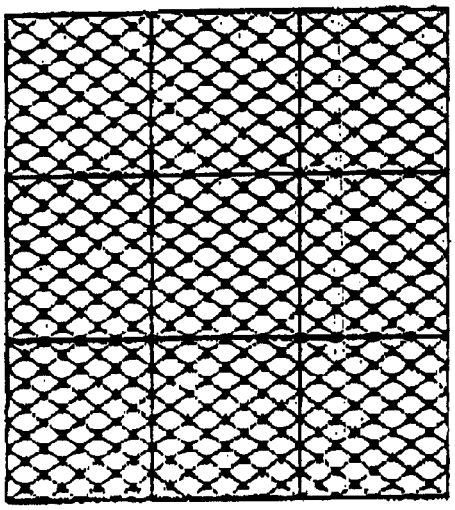
FIGS. 8a to 8d are an alternative set of four patterns with each defining a non-orthogonal mesh and a repeating parcel of printing areas, by way of further example.
Figure 8B:
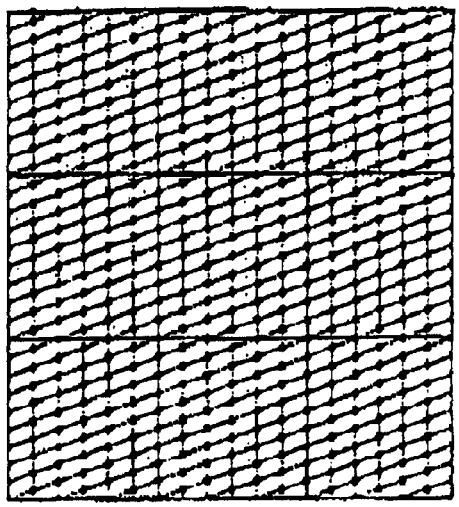
Figure 8C:
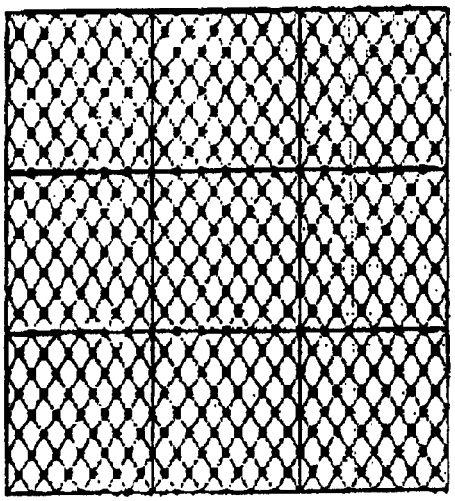
Figure 8D:
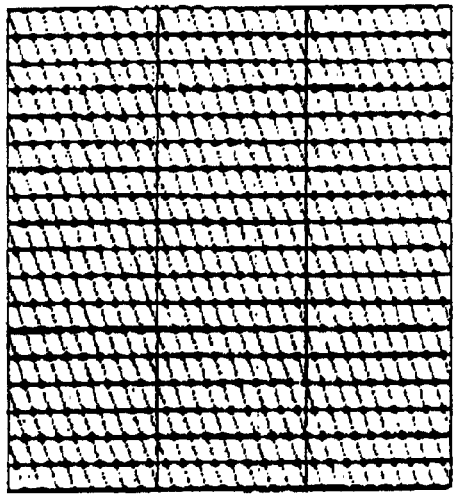

FIG. 4 outlines the conversion process of steps 24 and 34, as generally carried out by known RIP software. The process first receives pixel data including colour and tone information in step 40. Each pixel includes data which enables determination of a tone value for each of the colours in a chosen colour system, usually CMYK, for a small area located at the point represented by the pixel in the coloured image. The generation of a halftone screen for each of the colours produces a large amount of data that may be sorted in a common computer file or in separate files. This data usually takes the form of binary on/off instructions in relation to the output grid of a printing device. In steps 41 through 44 the pixel data is parsed for each of the required colours to determine halftone screen data for that colour. Mathematical constructs called spot functions or threshold matrices are used in step 42 to determine the halftone patterns which have been selected for the colours, as will be explained further below. Each pixel is compared with a threshold matrix for the particular colour and binary data relating to the output grid of the particular printing device is determined and stored in an appropriate computer file in step 43. Eventually the colour separation is complete and the halftone data can be store or output to the printer device in step 45 when required.

FIGS. 5a, 5b, 5c, 5d show four halftone patterns which form parts of four different colour screens according to the invention. They should be considered as patterns viewed from horizontal with respect to an image, representing different colours or black in a general sense, without limitation to screen related parameters such as dot frequencies and angles. The patterns might represent cyan, magenta, yellow and black in a four colour image generated by way of a halftone process such as outlined in FIG. 4. The printing areas in each pattern are composed of conventionally shaped round dots which may grow in size and shape in various ways, and may join in darker tones, according to variations in tone across the particular image. Other dot shapes may also be used, a uniformly light tone is represented here by way of example, and a similar pattern of non-printing areas would preferably but not necessarily appear in darker tones. It will be appreciated that a wide range of possible dot shapes and growths may be implemented in practice. It is primarily the relative arrangement of at least some of the patterns in a set of screens that make up an image which forms the subject of the invention.

FIGS. 6a, 6b, 6c, 6d show the patterns of FIGS. 5a, 5b, 5c, 5d each with a superimposed mesh formed by two sets of parallel lines which pass through the dots. The meshes are Anon-orthogonal@ in that the sets of lines intersect at other than righ angles and are not perpendicular. Each mesh has a repeating unit which takes the shape of an oblique parallelogram such as a rhombus with four equal length sides of a rhomboid with two pairs of different length sides. The meshes are also Aminimum@ in that the sides of each parallelogram are formed by the shortest or second shortest distances measured between the centres of the dots. The repeating unit may be either a rhombus with four shortest sides or a rhomboid with two shortest and two second shortest sides, a large number of meshes may be defined for each pattern including both orthogonal and non-orthogonal lines. However, it is believed that any pattern can have only a single minimum mesh of this kind. The minimum mesh is not necessarily used in calculation of the pattern but will usually be defined by consideration of a finished arrangement of printing areas determined by some other process.

FIGS. 7a, 7b, 7c, 7d show the patterns and meshes of FIGS. 6a, 6b, 6c, 6d each with a further superimposed mesh of a different kind. These meshes are orthogonal in this example, in that the two sets of parallel lines intersect at right angles, but may also be non-orthogonal. Each mesh has a repeating unit or Aparcel@ of printing areas which can take a more general range of parallelogram shapes including squares as shown, or rectangles, rhombii, rhomboids and so on. Still other non-parallelogram shapes which are able to repeat throughout a pattern may also be considered. These meshes are clearly not minimum meshes in that their parcels typically include a relatively large number of printing areas on each side, although once again, a wide range of meshes having repeating parcels can be defined for a particular pattern. It can be seen that the repeating parcels which are indicated in each of these figures are substantially the same in size, shape and orientation for all of the four patterns.

FIGS. 8a, 8b, 8c, 8d show four alternative halftone patterns which might also form parts of four different colour screens according to the invention. Once again the patterns each define an underlying non-orthogonal minimum mesh, and also another mesh with repeating parcels which have a shape and size in common with at least some of the other patterns. The parcels which are indicated in these figures will coincide when the patterns are laid one on the other, although the particular meshes need not have been drawn in this way. It is thought that the invention is best performed when all of the screens which make up an image have a non-orthogonal minimum mesh. Each minimum mesh is preferably but not necessarily different to the others. Two meshes are regarded as different not only when the shapes of their respective units are different, but also when the shapes are the same and the meshes are simply rotated with respect to each other. The invention is also best performed when all of the screens have a common repeating parcel of some kind. However, an image in which a selection of two or more, rather than all of the screens meet these requirements may also be visually acceptable.

Figure 9A:
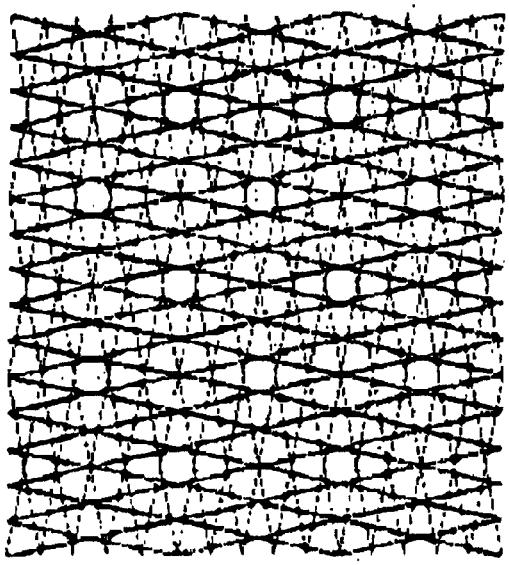
FIGS. 9a and 9b are combined patterns for FIGS. 6a, 6c and 6b, 6d respectively.
Figure 9B:
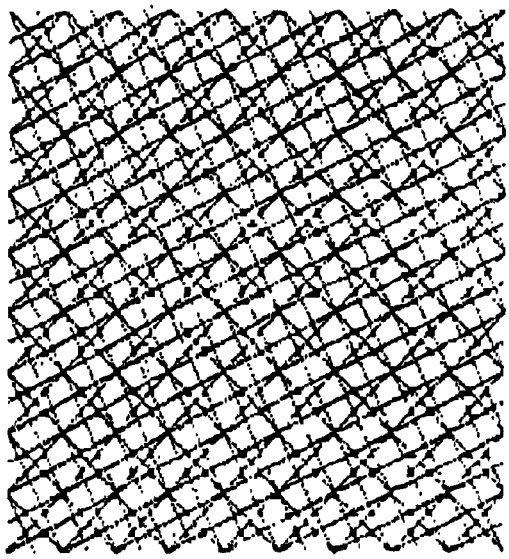
Figure 10A:
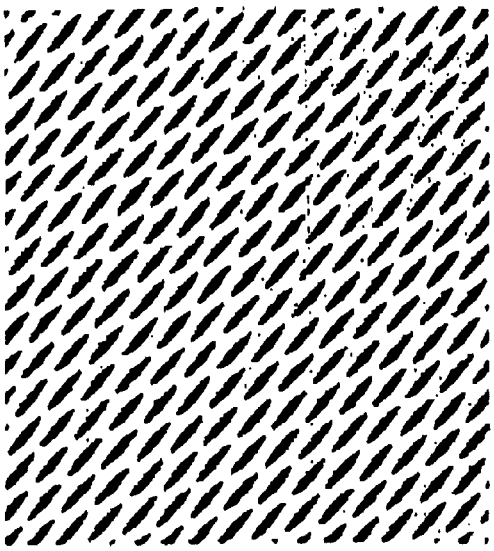
FIGS. 10a to 10d are the four patterns of FIGS. 5a to 5d with extended printing areas creating a darker tone.
Figure 10B:
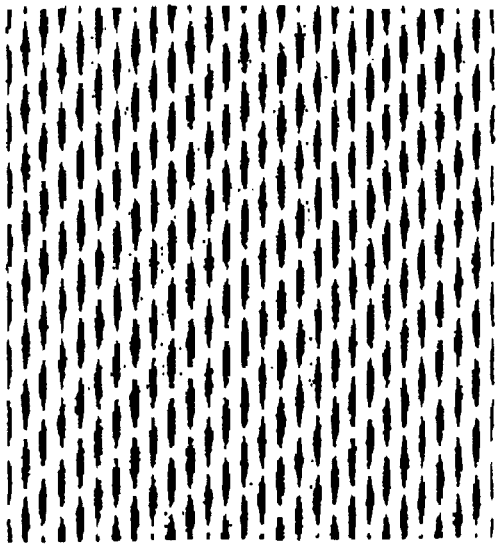
Figure 10C:
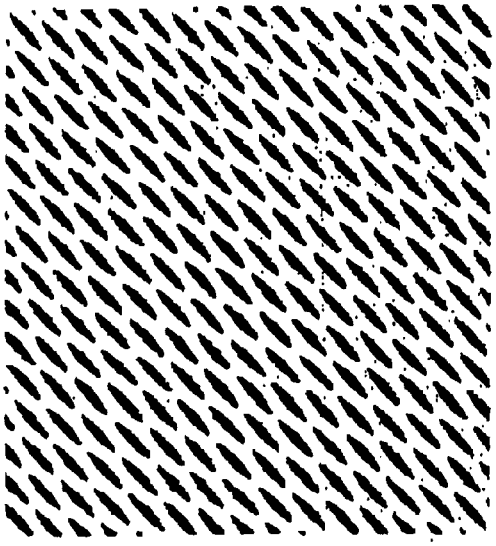
Figure 10D:
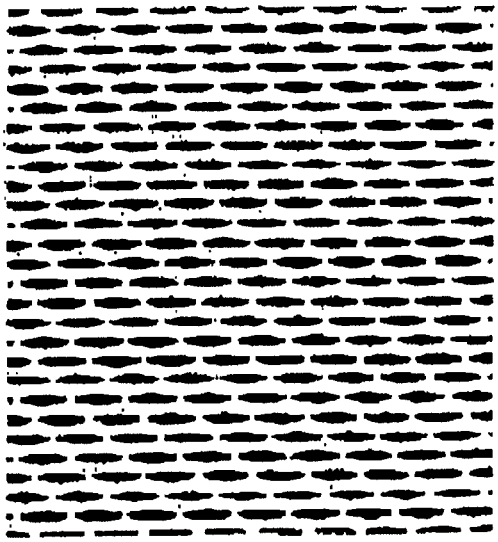

FIGS. 9a and 9b demonstrate pairs of patterns in combination, by way of further example, formed by superimposing the patterns of FIGS. 6a, 6c and 6b, 6d. They could represent combination of cyan, magenta and yellow, black. The visual aspect of the combined patterns is somewhat deceptive in that the different colours have different intensities when printed, with yellow being considerably less intense than black. However, it will be seen that the printing areas in these patterns have been arranged in a way which reduces their overlap in light tones. The figures are also deceptive in that the combination of non-orthogonal meshes can be interpreted as two orthogonal meshes which the eye tends to favour. The arrangement has been determined manually although a more rigorous computer based method might also be used. It is generally impossible to eliminate all overlap throughout an image because the printing areas will necessarily grow and overlap in darker tones, with corresponding shrinkage and fragmentation of the non-printing areas.

FIGS. 10a, 10b, 10c, 10d show the patterns of FIGS. 5a, 5b, 5c, 5d with preferred forms of dot growth in mid to darker tones. In general terms the printing areas of each pattern become oval or lenticular shapes which enlarge first in an initial direction as shown, and then in another. In each case however, the directions of growth are preferably towards nearby printing areas, and preferably but not necessarily differ between the patterns of a particular image. The areas of each pattern therefore join in two distinct stages resulting from their growth in two different directions. This reduces the effects of tone jump caused by physical effects in the ink with which the patterns are eventually printed. The directions of growth preferably lie along the second and more preferably the third or fourth shortest distances between printing areas as shown. The third and fourth shortest distances between printing areas are generally diagonals in the repeating unit of the minimum mesh. Growth along the longest diagonal between neighbouring areas in a repeating unit will often produce the best result. Growth along the shortest distance is generally along one of the sides of the repeating unit and can produce undesirable line aspects in the image. The second shortest distance can be either a line or a diagonal depending on the particular mesh.

Figure 11A:
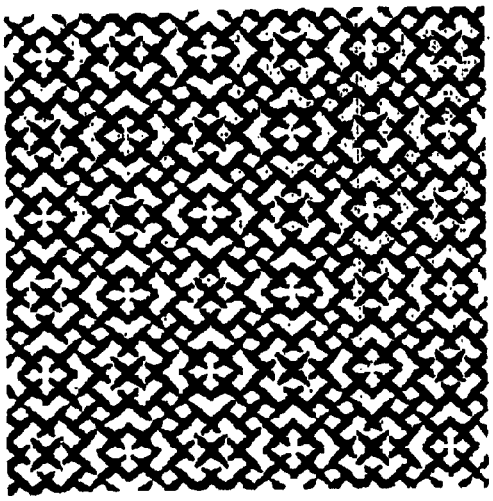
FIGS. 11a and 11b are combined patterns and meshes for FIGS. 10a, 10c and 10b, 10d respectively, FIG. 12 demonstrates the combined patterns and meshes of FIGS. 9a and 9b, FIG. 13 demonstrates the combined patterns of FIGS. 11a and 11b, FIGS. 14a, 14b, 14c, 14d demonstrate preferred growth patterns for dots in a few selected cases.
Figure 11B:
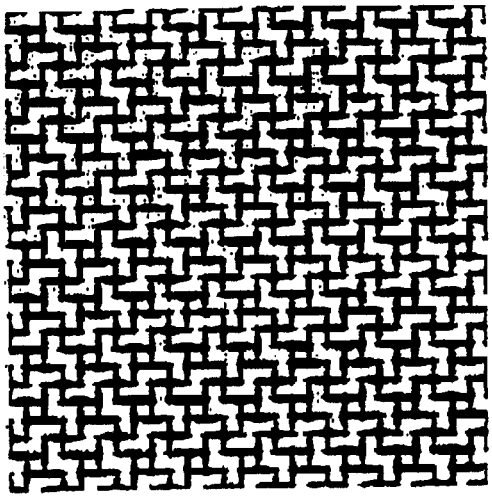

FIGS. 11a and 11b demonstrate pairs of patterns in combination showing their initial directions of growth in the printing areas. They are taken from the patterns of FIGS. 10a, 10c and 10b, 10d respectively and could for example, represent combinations of cyan, magenta and yellow, black. For these particular combinations of colours the areas preferably, but as usual not necessarily, grow in perpendicular directions.

Figure 12:
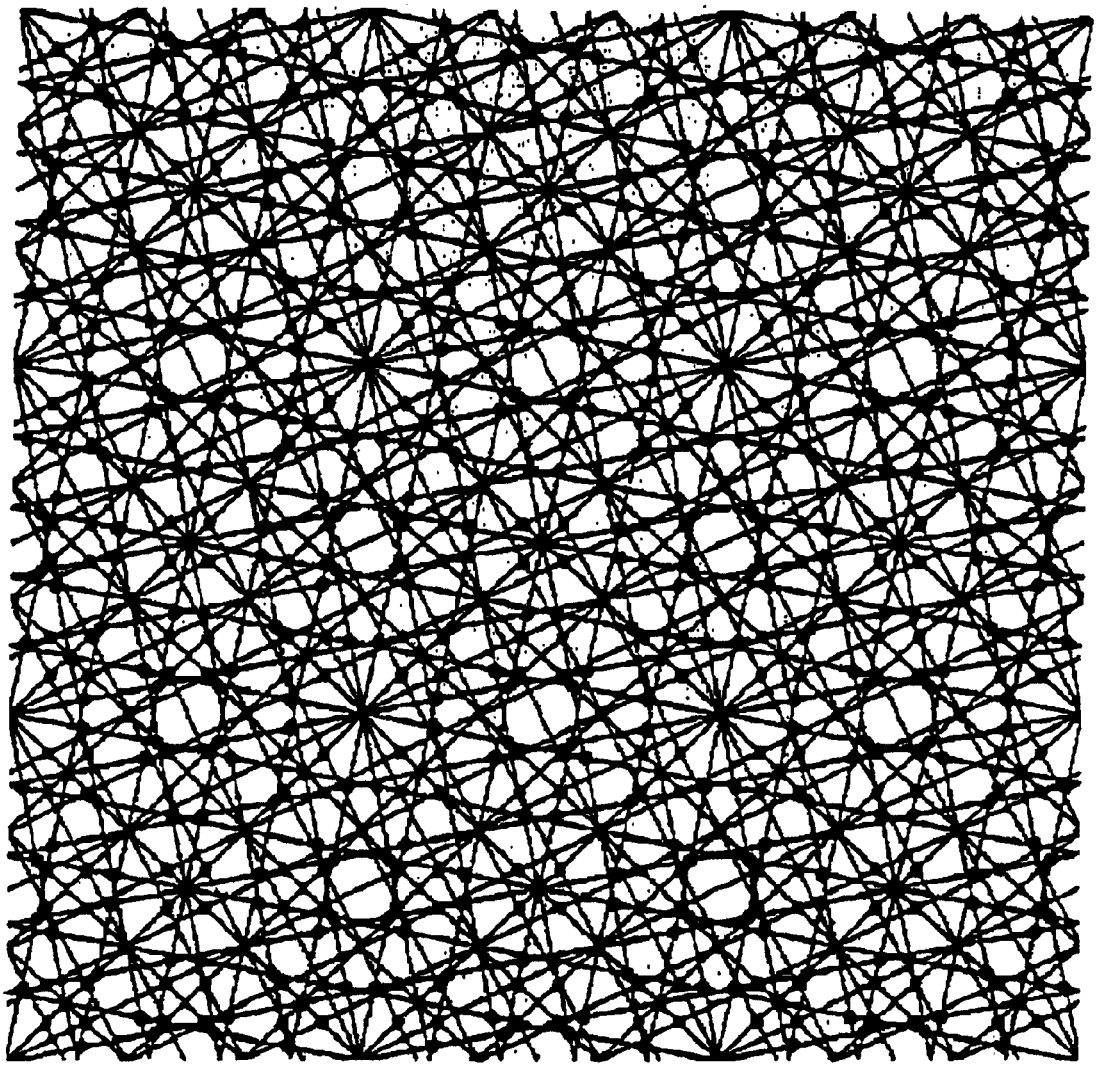
Figure 13:
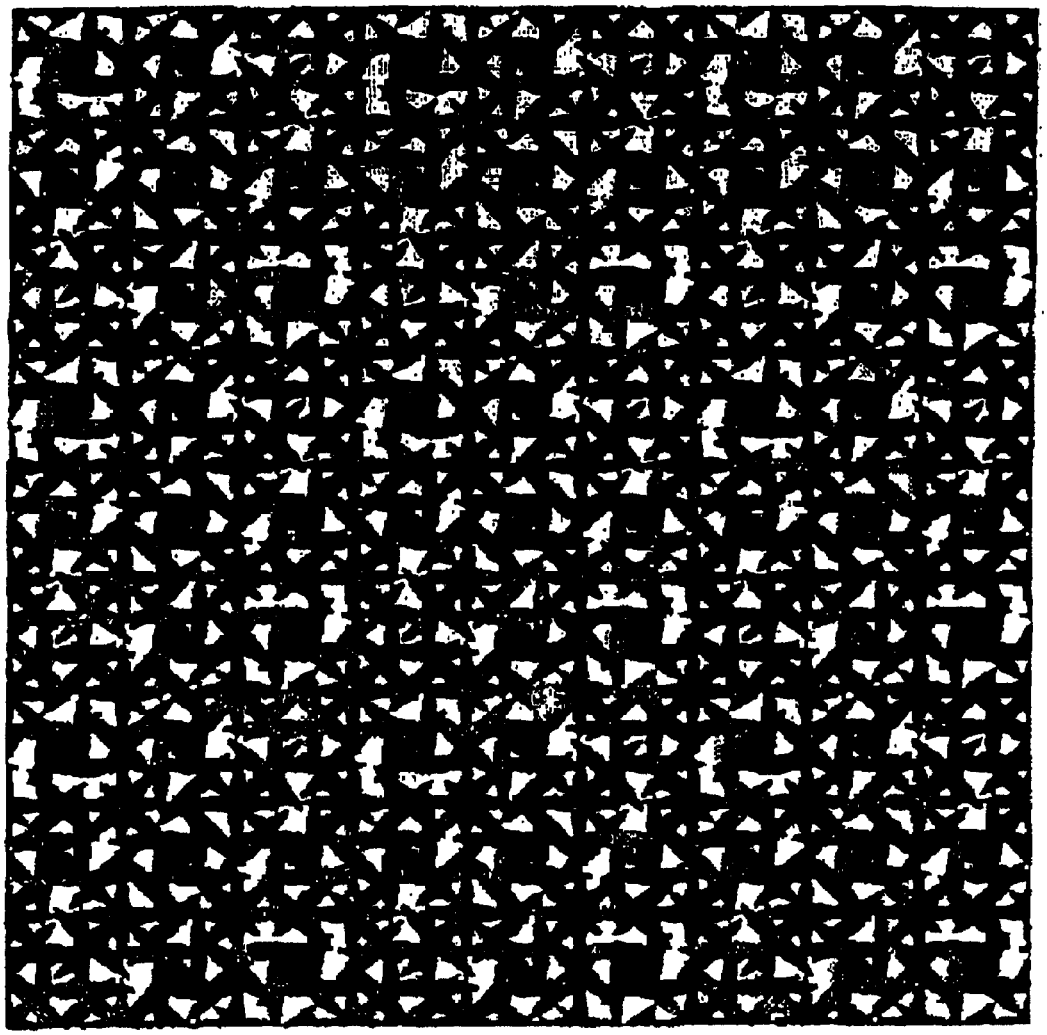

FIGS. 12 and 13 are provided as an attempt to demonstrate the nature of an image combining four patterns according to the invention. They are taken from the patterns of FIGS. 9a, 9b and 11a, 11b respectively. An illusion of orthogonal meshes exists as before. The absence of any significant moire effect is clearly seen although it is impossible to indicate the absence of other colour effects. Reasonable mis-registration of the patterns has not been observed to cause any significant colour shift in these examples.

Figure 14A:
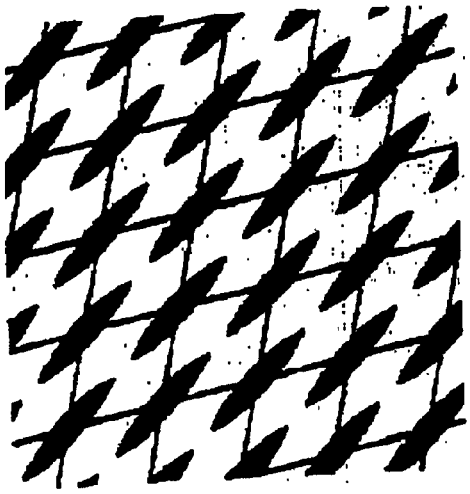
Figure 14B:
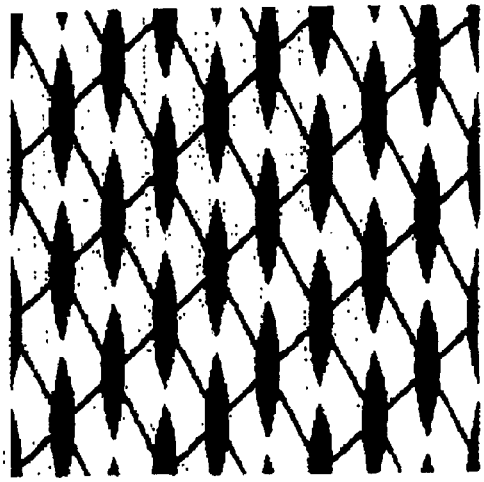
Figure 14C:
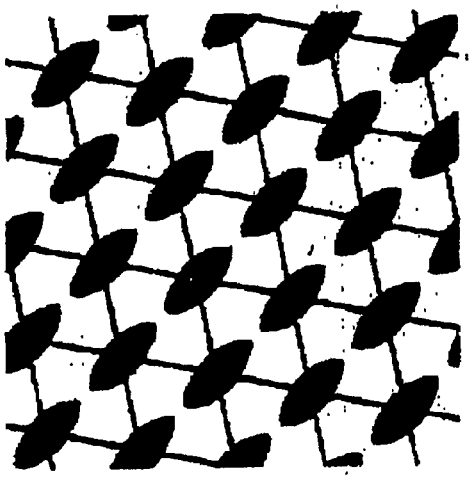
Figure 14D:
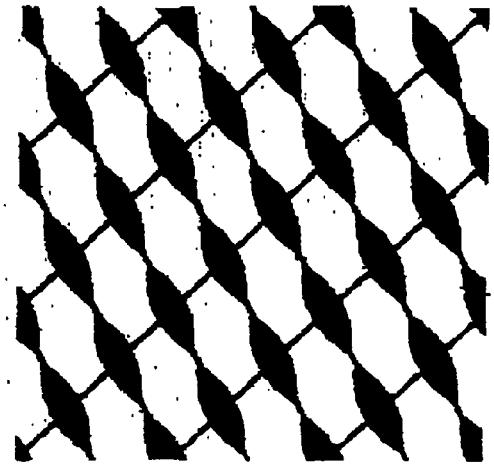

FIGS. 14a, 14b, 14c and 14d demonstrate preferred growth of printing areas to light to mid tones and may be compared with FIGS. 10a, 10b, 10c and 10d. FIG. 14a demonstrates growth along the third shortest distance between near neighbouring dots on a non-orthogonal minimum mesh. Given that the repeating unit of this mesh is a parallelogram with two equal sides this also demonstrates growth along the longest distance in a repeating unit, namely the longest diagonal. FIG. 14a directly matches FIG. 10a and on rotation matches FIG. 10c, FIG. 14b demonstrates growth along the fourth shortest but again the longest distance between neighbouring dots. The repeating unit of the non-orthogonal mesh has unequal sides. It matches FIG. 10b and on rotation FIG. 10d. FIG. 14c demonstrates growth along the second shortest distance for a repeat unit having two equal sides, which is the shortest diagonal. FIG. 14d demonstrates growth along the second shortest distance for a repeat unit having unequal sides, which is now the longest side rather than a diagonal. Dot growth considerations of this general kind are useful in orthogonal meshes also.

FIGS. 15 and 16 show typical Acells@ which might be used in relation to the process of FIG. 4 to produce halftone patterns having non-orthogonal minimum meshes. These cells relate to the patterns which are shown in FIGS. 8a to 8d, by way of example. Larger cells could also be used such as the parcels themselves as shown in FIGS. 7a to 7d. Each cell corresponds to a relatively small group of pixels in the image data received in step 40 of FIG. 4. They contain whole and partial portions of printing areas, in the form of circular dots in this case which might be present in light tones of a halftone image. Dots which lie on the sides and corners of the cells are regarded as being shared with neighbouring cells so that there are effectively two and six dots respectively in FIGS. 15 and 16. The proportion of printing to non-printing areas in each cell relates to the tone or intensity of the particular colour or that point in the image. In practice the dots are composed of many smaller spots which are formed by an output device such as a laser printer, and would not have perfectly circular periphery on close inspection. The halftone data which makes up an image primarily comprises instructions for generation of these spots.

FIG. 17 provides a simple example of a hypothetical threshold matrix for purposes of further explanation of the process in FIG. 4, a matrix of this kind, although generally much more extensive, may be used to determine which of the spots in the halftone cells of a particular colour screen are required when an image is output. The matrix for a particular colour determines the shape of the dots of that colour and how they change to represent different levels of intensity for the colour in the image. Each element in the matrix represents a printing spot in the output grid of a device such as a laser printer. The matrix in this example could be used to determine a cell such as shown in FIG. 15, although given the limited number of Aspots@ the dots would be far from the circular shape. Careful selection of the elements can be used to determine the overall pattern of printing areas in a screen and how the shape of the areas changes with tone. The content of the matrix may be prepared either manually or according to a formula, and then stored for lookup when converting an image from pixel to halftone data. Alternatively the formula, sometimes called a spot function, could be used to calculate the content when required during the conversion process.

In FIG. 17 the elements of a particular matrix are assigned threshold values for comparison with the tone of the particular colour of the group of pixels which corresponds to each cell. The values are spread between a maximum tone in which every spot would print, and a minimum tone in which none of the spots would print. In this example, the maximum tone is represented by the value A35@ representing a uniformly dark cell, and the minimum tone by the value A0@ representing a uniformly light cell. Suppose that this matrix had been created for the colour cyan, and for a particular cell somewhere in an image undergoing conversion from pixel data to halftone data, the tone for cyan was A5@. Only those spots having threshold values less than or equal to A5@ would be required to represent the relatively light tone at that point in the printed image. Halftone data for the cyan screen would be stored for that cell indicating that only the centre and corner spots were required. The content of the cell would approximately resemble that of FIG. 15, except hat the corner dots would be four times larger than the centre dots, given the effect of neighbouring cells, a tone value of A8@ would produce a central dot having four spots, in the shape of an inverted AT@, and so on for darker tones.

The explanation of a process for conversion of pixel data to halftone data is given by way of example only. Various processes may be used to create patterns according to the present invention. Threshold matrices used in these processes may be extensive, a square matrix having 92×92 elements has been used for the cyan screen in some tests, a rectangular matrix having 46×69 elements has been used for the black screen. The repeating parcel has been a square of 276×276 elements. Practical procedures are complex and varied as will be appreciated by a skilled reader.

The invention claimed is:

1. A screen system having:

a plurality of screens each representing different colours or black in a digital original image, each screen has a pattern of printing areas which defines a minimum mesh, each pattern has a parcel of printing areas which repeats throughout the respective screen, and two or more of the screens have different non-orthogonal minimum meshes and have parcels which correspond in shape and size, said two or more screens having different non-orthogonal minimum meshes have printing areas which extend to join first along directions other than that of their closest spacing and;

a processor arrangement configured to take as input the digital original image and to generate, using the plurality of screens, a coloured halftone image.

2. A system according to claim 1 wherein:

each minimum mesh is formed by two sets of parallel lines which lie along directions defined by equal shortest or shortest and next shortest distances between the printing areas.

3. A system according to claim 2 wherein:

at least two of the minimum meshes are non-orthogonal in that the two sets of lines are not perpendicular.

4. A system according to claim 1 wherein:

the parcels which correspond, between the two or more screens have a parallelogram shape.

5. A system according to claim 1 wherein:

the parcels which correspond between the two or more screens have a common orientation.

6. A system according to claim 1 wherein:

the parcels are formed according to an orthogonal mesh.

7. A system according to claim 1 wherein:

the printing areas in darker tones extend along next shortest or longer distances between the areas.

8. A method of preparing halftone patterns for production of a coloured image, comprising:

receiving information representing colour and tone variation in an image, creating a plurality of printing patterns which represent different colours or black in the image, forming each pattern from variable printing areas which define respective meshes and repeating parcels, at least two of the patterns having different non-orthogonal minimum meshes and corresponding parcels which are substantially similar in shape and size, said at least two patterns having printing areas which extend to join first along directions other than that of their closest spacing.

9. A method according to claim 8 wherein:

the non-orthogonal meshes are each defined by two sets of parallel lines which intersect at non-right angles.

10. A method according to claim 8 wherein:

the corresponding parcels are substantially similar in orientation.

11. A method according to claim 8 wherein:

the patterns each have different arrangements of printing areas within their respective parcels.

12. A method according to claim 8 further comprising:

joining the printing areas in darker tones along directions of second shortest or longer distances between the areas.

13. A screen system having:

a plurality of screens, each screen has a pattern of printing areas which defines a minimum mesh, the minimum meshes of at least two screens are non-orthogonal and have printing areas which extend to join first along directions other than that of their closest spacing and;

a processor arrangement configured to take as input a digital original image and to generate, using the plurality of screens, a coloured halftone image.

14. A screen system according to claim 13 wherein: all of the screens have non-orthogonal meshes.

15. A method of preparing a halftone pattern, comprising:

receiving information representing tone variation in an image, creating a pattern of printing areas which represents the variation by forming the pattern to define a non-orthogonal minimum mesh, and varying the printing areas by extension toward nearby areas other than their nearest neighbours.

16. A method according to claim 15 further comprising:

extending the printing areas toward their second or third nearest neighbours.

17. Apparatus which implements a screen system according to any one of claims 1–7, 13 and 14.

18. Apparatus which implements a method according to any one of claims 8–12, 15 and 16.

*19. A screen system having:*

*a plurality of screens, each screen having a pattern of printing areas which defines a minimum mesh, the minimum meshes of at least one screen being orthogonal and having printing areas which, in darker tones, extend toward nearby printing areas other than their nearest neighbours; and*

*a processor arrangement configured to take as input a digital original image and to generate, using the plurality of screens, a coloured halftone image.*

*20. A system according to claim 19 wherein:*

*in darker tones, the printing areas join with nearby printing areas other than their nearest neighbours.*

*21. A system according to claim 19 wherein:*

*in darker tones, the printing areas join with nearby printing areas in a direction different to a direction of extension of the printing areas.*

*22. A system according to claim 19 wherein:*

*in darker tones, the printing areas join with nearest neighbour printing areas.*

*23. A method of preparing a halftone pattern, comprising:*

*receiving information representing tone variation in an image,*

*creating a pattern of printing areas which represents the variation by forming the pattern to define a minimum mesh, and*

*varying the printing areas by extension toward nearby neighbours other than their nearest neighbours.*

*24. A method according to claim 23 further comprising:*

*joining the printing areas in darker tones with nearby printing areas other than their nearest neighbours.*

*25. A method according to claim 23 further comprising:*

*joining the printing areas in darker tones along directions different to a direction of extension of the printing areas.*

*26. A method according to claim 23 wherein:*

*joining the printing areas in darker tones with nearest neighbour printing areas.*

* * * * *